United States Patent

[11] 3,599,338

| [72] | Inventors | Norman J. Gillespie<br>204 Snowdon Ave., Toronto, 12 Ontario;<br>George A. Scroggie, 56 Hawksbury Drive,<br>Willowdale, Ontario, both of, Canada |
|---|---|---|
| [21] | Appl. No. | 39,031 |
| [22] | Filed | May 20, 1970 |
| [45] | Patented | Aug. 17, 1971 |

[54] DRAFTING DEVICE INCLUDING A SEMITRANSPARENT REFLECTOR
9 Claims, 3 Drawing Figs.

[52] U.S. Cl. ........................................... 33/75,
    33/107
[51] Int. Cl. ............................................ B43l 7/00,
    B43l 13/00
[50] Field of Search........................................ 356/138,
    144, 150, 153; 33/75, 107

[56] References Cited
UNITED STATES PATENTS

| 2,977,840 | 4/1961 | Duclo.......................... | 33/107 |
| 2,445,795 | 7/1948 | Lunncy....................... | 356/156 |

Primary Examiner—Ronald L. Wibert
Assistant Examiner—Orville B. Chew II
Attorney—Fetherstonhaugh and Co.

ABSTRACT: This invention relates to a geometric instrument that consists of a mirror and means for standing the mirror in a vertical disposition on a drawing surface. The mirror is formed with a guide means such as a rebated bottom edge for scribing a line on the drawing surface that is parallel to the planar reflecting surface and a distance behind the planar reflecting surface taken along a line perpendicular to the plane of said planar reflecting surface to constitute the said line the right bisector of a line joining a first point in front of the mirror and a second point behind the mirror. The device has many applications in geometric construction.

PATENTED AUG 17 1971

3,599,338

INVENTORS
NORMAN JARVIS GILLESPIE
GEORGE A. SCROGGIE
BY
Featherstonhaugh & Co.
ATTORNEYS

DRAFTING DEVICE INCLUDING A SEMITRANSPARENT REFLECTOR

This invention relates to a transparent mirror device for mapping a geometric figure onto a congruent figure and scribing the right bisectors (sometimes called perpendicular bisectors) of the segments joining corresponding points of the two figures.

A device having this capability has great utility as a geometric instrument. With it one can readily draw the right bisector of a segment of a line, locate the center of a circle, draw the line of centers of two circles, draw a midline between two parallel lines, bisect an angle, etc.

The device makes use of a transparent mirror and of the universally known characteristic of a mirror that the mirror image appears to be as far behind the reflecting surface of the mirror as the object is in front.

According to the invention, the mirror is mountable on a drawing surface and the bottom edge of the mirror is rebated so that this characteristic of a transparent mirror can be utilized to perform the constructions noted above.

A geometric device according to the invention comprises a transparent mirror defined by a planar reflecting surface and a planar back surface, said mirror having a bottom surface, means for supporting said transparent mirror on a planar drawing surface with said planar reflecting surface perpendicular to said drawing surface, guide means on said device for scribing a line segment on said planar drawing surface that is parallel to said planar reflecting surface and a distance behind said planar reflecting surface taken along a line perpendicular to the plane of said planar reflecting surface to constitute said line, the approximate right bisector of a line joining the first point in front of said planar reflecting surface and a second point behind said planar back surface, which when viewed from the front appears to coincide with the image of the first point.

Figures 1, 2, 3:
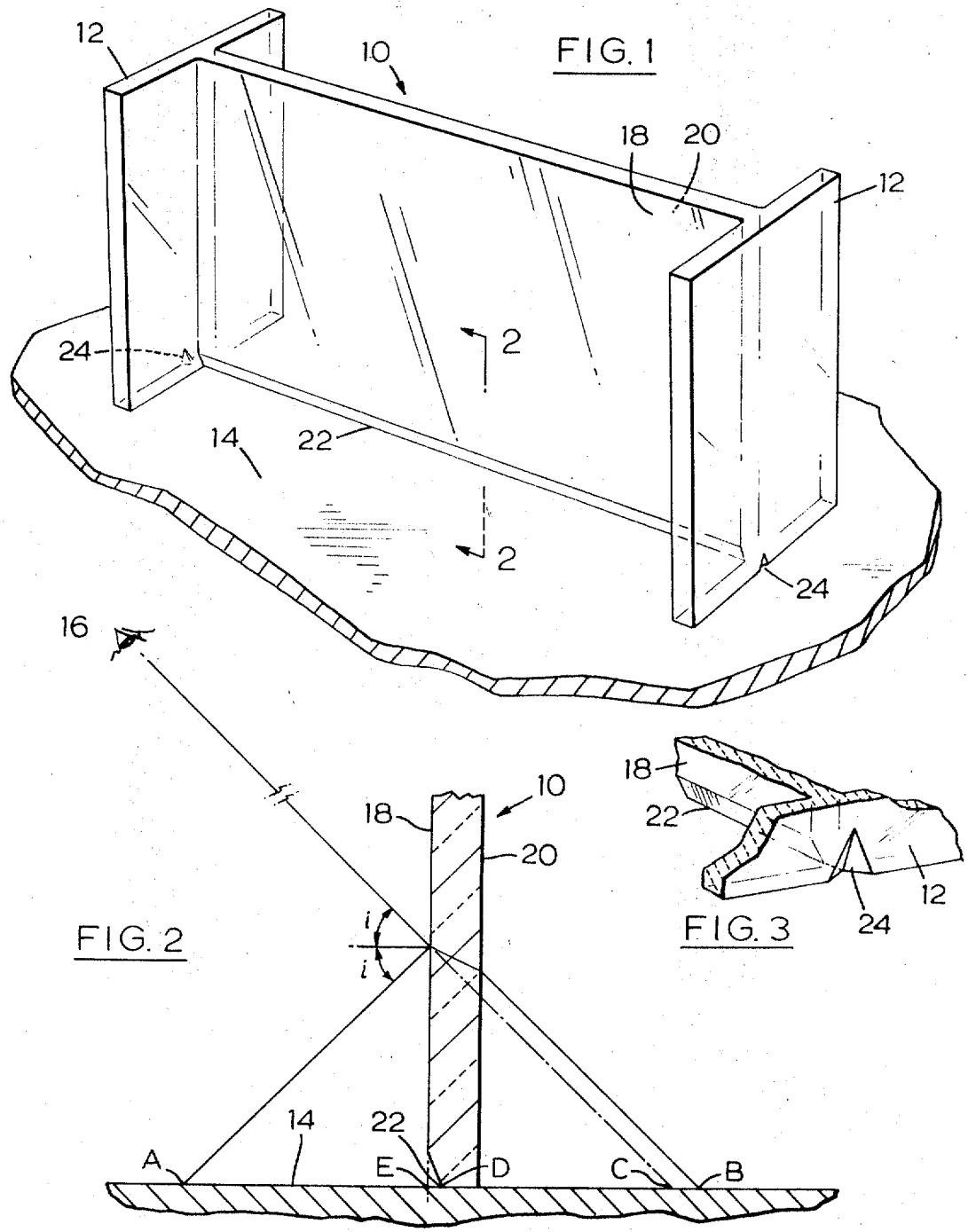
FIG. 1 is a perspective view of a drafting device of the invention.
FIG. 2 is an enlarged sectional view showing the path of a reflected ray from in front of the mirror and a refracted ray from behind the mirror.
FIG. 3 is a detailed perspective of the notched end.

FIG. 1 is a perspective view of a geometric device which consists of a rectangular transparent mirror 10 with end stands 12 that support the mirror 10 on a planar surface 14 with the mirror perpendicular to the planar surface. The device is made of acrylic plastic or like material.

Referring to FIG. 2, the letter A refers to a point on the planar surface upon which the device is set up. The reflection image of A as viewed from 16 appears to be behind the mirror at C.

FIG. 2 is a section through the mirror 10 taken in a plane containing A, C and 16. In this view the reflecting surface of the mirror is indicated by the numeral 18 and the back surface of the mirror is indicated by the numeral 20. Because of the refracting properties of the mirror and the thickness of the mirror, there exists a point B behind the mirror such that the light travelling from B to the point 16 appears to come from C, the location of the image of A when viewed in the reflecting surface 18. The point C is as far behind the reflecting surface as the point A is in front of it and the right bisector of AC on the surface 14 is the line of intersection of the planar surface 14 and the reflecting surface 18. The right bisector of BA, where B is the point behind the mirror from which light travelling to 16 emanates, is a line in the surface 14 and is located at a distance ½ BC behind the plane of the reflecting surface 18.

The marginal portion of the reflecting surface 18 of the mirror 10 that is adjacent the bottom surface is rebated to define a scribing edge 22 which is the right bisector of AB. Thus, when the device is set up as described, one can scribe the right bisector of the segment AB on the planar surface 14 on which it is set up.

For all practical purposes, the amount of the rebate, the distance ½ BC is a constant. It is from this fact that the great utility of the device as a geometric instrument flows. A single scribing line will draw the right bisector approximate enough for all practical purposes and for all practical angles of view.

Suppose two points A and B are marked on surface 14 and it is desired to draw the right bisector of the line segment joining them. The mirror 10 is adjusted on surface 14 so that the reflection image of A, as viewed from 16, maps onto or coincides with the refraction image of B. The reflected ray from A appears to come from C where AE=EC, and, because of the thickness of the mirror and its refraction property, the refracted ray from B also appears to come from C. B is in fact farther behind the mirror than C and in order to obtain the right bisector of the segment joining A and B, the bottom edge of the mirror is bevelled back a distance ED so that AD=DB. The distance ED=½ BC and it may be shown that $$ED = 1/2\,BC = \frac{t}{2}\left(1 - \frac{\cos i}{\sqrt{\mu^2 - \sin^2 i}}\right)$$

where $t$ is the thickness of the mirror, $\mu$ is its index of refraction, and $i$ the viewing angle of incidence.

For any given transparent mirror $t$ and $\mu$ are constant, and the formula expresses the theoretical depth of the bevel in terms of $i$. The theoretical range of $i$ is 0° to 90° and the corresponding range for the depth of the rebate or bevel is $$\frac{t}{2}\left(1 - \frac{1}{\mu}\right) \text{ to } \frac{t}{2}$$

For an ⅛-inch thick mirror of acrylic plastic whose index is about 1.5, this range is 0.021 to 0.063 inches.

In practice the approximate range of the viewing angle is 10° to 75° and the corresponding range of the theoretical rebate is $$\frac{t}{2}\left(1 - \frac{\cos 10°}{\sqrt{\mu^2 - \sin^2 10°}}\right) \text{ to } \frac{t}{2}\left(1 - \frac{\cos 75°}{\sqrt{\mu^2 - \sin^2 75°}}\right)$$

For an ⅛ inch thick mirror whose index IS 1.5, this range is 0.021 to 0.048 inches.

For optimum viewing the range of the viewing angle is 20° to 45° and the corresponding range of the theoretical rebate is $$\frac{t}{2}\left(1 - \frac{\cos 20°}{\sqrt{\mu^2 - \sin^2 20°}}\right) \text{ to } \frac{t}{2}\left(1 - \frac{\cos 45°}{\sqrt{\mu^2 - \sin^2 45°}}\right)$$

For an ⅛-inch thick mirror whose index is 1.5, this range is 0.022 to 0.029 inches.

A given rebate must be chosen for a design and preferably its depth is calculated for a viewing angle of 40°. This theoretical depth is $$\frac{t}{2}\left(1 - \frac{\cos 40°}{\sqrt{\mu^2 - \sin^2 40°}}\right)$$

For an ⅛-inch thick mirror whose index is 1.5, this depth is 0.027 inches.

These results are summarized for an ⅛-inch thick acrylic mirror with a refractive index of 1.5

|  | $i°$ | theoretical depth (inches) |
|---|---|---|
| maximum | 0° to 90° | 0.021 to 0.063 |
| practical | 10° to 75° | 0.021 to 0.048 |
| ideal | 20° to 45° | 0.022 to 0.029 |
| fixed | 40° | 0.027 |

For each of these calculations the theoretical depth of the rebate must be increased to accommodate the displacement of a sharp pencil line from the edge of the bevel. This displacement is of the order of 0.015 inches. For example, in the case of the fixed rebate given above, the rebate is 0.027 inches + 0.015 inches = 0.042 inches deep.

It will be noted that the ends 12 of the device are notched so that the vertex of each notch 24 on the drawing surface is in line with the scribing line. Either notch may then be used to demonstrate that a rotation is the composition of two reflections in scribing lines that intersect in the vertex of the notch. Moreover these notches could be used to scribe a line segment on surface 14 which would be equivalent to a line drawn along edge 22. One would merely make a point at the vertex of each notch on the surface 14 and then join the two points with a straight edge.

The use of the device has been described for scribing the right bisector of the line segment joining the points A and B, i.e. scribe a line on surface 14 along edge 22. A similar procedure can be used with some other figures, e.g. to locate the center of a circle one would draw a diameter of the circle by reflecting one-half of the circle on to the other half and scribing along edge 22, and by a similar procedure obtaining a second diameter. By a similar procedure of reflecting one arm of an angle on to the other and scribing along edge 22, one can bisect an angle. The principle has many other applications and uses.

What we claim as our invention is:

1. A geometric device comprising a transparent mirror defined by a planar reflecting surface and a planar back surface, said mirror having a bottom surface, means for supporting said transparent mirror on a planar drawing surface with said planar reflecting surface perpendicular to said planar drawing surface, guide means on said device for scribing a line segment on said planar drawing surface that is parallel to said planar reflecting surface and a distance behind said planar reflecting surface taken along a line perpendicular to the plane of said planar reflecting surface to constitute said line, the approximate right bisector of a line joining a first point in front of said planar reflecting surface and a second point behind said planar back surface, which when viewed from the front appears to coincide with the image of the first point.

2. A geometric device as claimed in claim 1, in which said guide means comprises a scribing edge formed by rebating the marginal portion of said planar reflecting surface that is adjacent said bottom surface, said distance being $$.015 \text{ inches} + \frac{t}{2}\left(1 - \frac{\cos i}{\sqrt{\mu^2 - \sin^2 i}}\right)$$

where $t$ is the distance between said reflecting surface and said back surface, $i$ is the viewing angle of incidence between 10° and 75° and $\mu$ is the refractive index of the mirror material.

3. A geometric device as claimed in claim 2, in which the angle $i$ is between 20° and 45°.

4. A geometric device as claimed in claim 2, in which the angle $i$ is about 40°.

5. A geometric device as claimed in claim 1, in which said guide means comprises a scribing edge formed by rebating the marginal portion of said planar reflecting surface that is adjacent said bottom surface.

6. A geometric device as claimed in claim 1, in which said means for supporting said mirror comprises an end stand panel at each end of said mirror and said guide means for scribing a line segment comprises a notch formed in each of said end supports, each of said notches having a vertex at the plane of the bottom of said mirror, the line segment joining the vertex of each of said notches being parallel to said planar reflecting surface and a distance behind said planar reflecting surface taken along a line perpendicular to the plane of said planar reflecting surface to constitute said line, the right bisector of a line joining a first point in front of said planar reflecting surface and a second point behind said planar back surface, which when viewed from the front appears to coincide with the image of the first point.

7. A geometric device as claimed in claim 6, in which said distance is 0.015 inches $$+ \frac{t}{2}\left(1 - \frac{\cos i}{\sqrt{\mu^2 - \sin^2 i}}\right)$$

where $t$ is the distance between said reflecting surface and said back surface, $i$ is the viewing angle of incidence between 10° and 75° and $\mu$ is the refractive index of the mirror material.

8. A geometric device as claimed in claim 7, in which the angle $i$ is between 20° and 45°.

9. A geometric device as claimed in claim 7, in which the angle $i$ is about 40°.